Feb. 21, 1967 J. H. REED 3,304,779
PRESSURE DIFFERENTIAL INDICATING SYSTEM FOR FLUID FLOW
Filed Jan. 2, 1964 3 Sheets-Sheet 1
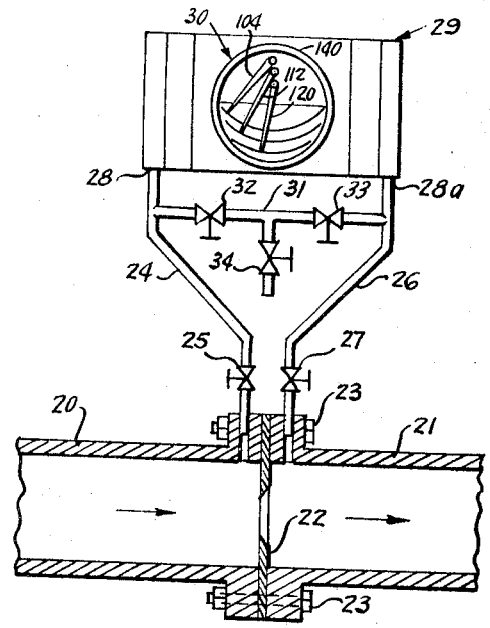
FIG.1
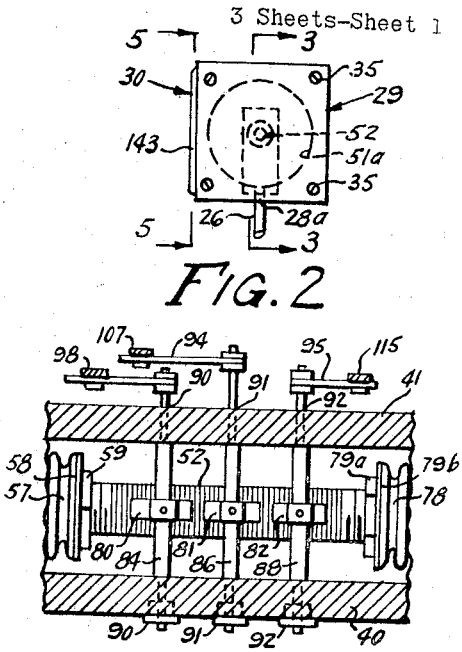
FIG.2
FIG.4
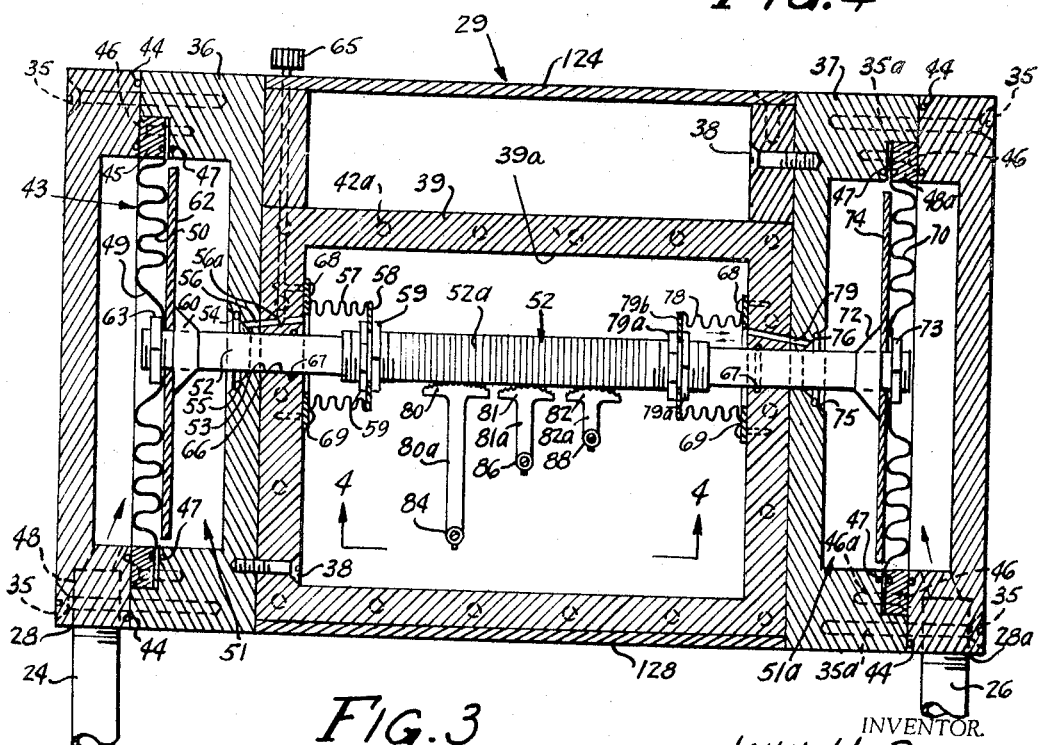
FIG.3
INVENTOR.
JOHN H. REED
BY
Kimmel & Crowell
ATTORNEYS.

Feb. 21, 1967  J. H. REED  3,304,779
PRESSURE DIFFERENTIAL INDICATING SYSTEM FOR FLUID FLOW
Filed Jan. 2, 1964  3 Sheets-Sheet 3

INVENTOR.
JOHN H. REED
BY
Kimmel & Crowell
ATTORNEYS.

United States Patent Office 3,304,779
Patented Feb. 21, 1967

3,304,779
PRESSURE DIFFERENTAL INDICATING
SYSTEM FOR FLUID FLOW
John H. Reed, Kermit, Tex., assignor to Tri-Meter Mfg.
Co., Kermit, Tex., a corporation of Texas
Filed Jan. 2, 1964, Ser. No. 335,032
10 Claims. (Cl. 73—205)

This invention relates to a pressure differential indicating system for indicating and directly measuring fluid flow through an orifice of a conduit and the like.

In the past, the differential pressure at an orifice or venturi passage was measured by a Pitot tube, separate gauges and the like on each side of an orifice to record the differential pressures of flow on each side of the orifice or restriction, and two reading for an observation was recorded on a data sheet and each observation for a steady state of flow was substituted into an empirical formula and calculated, which was an arduous and tedious task consuming much labor and time to determine the rate of fluid flow through a conduit and the like.

The instant invention overcomes the above problems by providing a direct reading in differential pressure for a rate of fluid flow through a conduit for each corresponding set of the above differential pressures for a steady state of fluid flow through a conduit.

The primary object of this invention is to provide a direct reading and calibrated differential pressure unit and system for various rates of fluid flows through a conduit and the like.

Another object of the invention is to provide a measuring differential pressure unit and system for recording the various rates of fluid flow, such as gas, water and the like, through a pipe or conduit means.

A further object of the invention is to provide a differential reading means and system for indicating various ranges of calibrated differential pressures of fluid flow through an orifice, meter or the like, which will give an accurate, responsive and sensitive reading for ascertaining fluid flow through a conduit under various conditions.

Other objects and features of the invention will become apparent to those skilled in the art as the disclosure is made in the following detailed description of a preferred embodiment of the invention as illustrated in the accompanying drawings in which:

FIGURE 1 is a test setup showing in cross-section an orifice means installed in a pipe or conduit means for fluid flow having valved drain and differential pressure connections from both sides of the orifice interconnected to two corresponding pressure intake means of the differential pressure measuring and reading unit of the present invention;

FIGURE 2 is an end elevational view in elevation of the differential pressure unit of the present invention;

FIGURE 3 is an enlarged cross-sectional view of the differential pressure unit taken on lines 3—3 of FIGURE 2 in the direction of the arrows;

FIGURE 4 is a fragmentary sectional view taken on lines 4—4 of FIG. 3 in the direction of the arrows;

Figure 5:
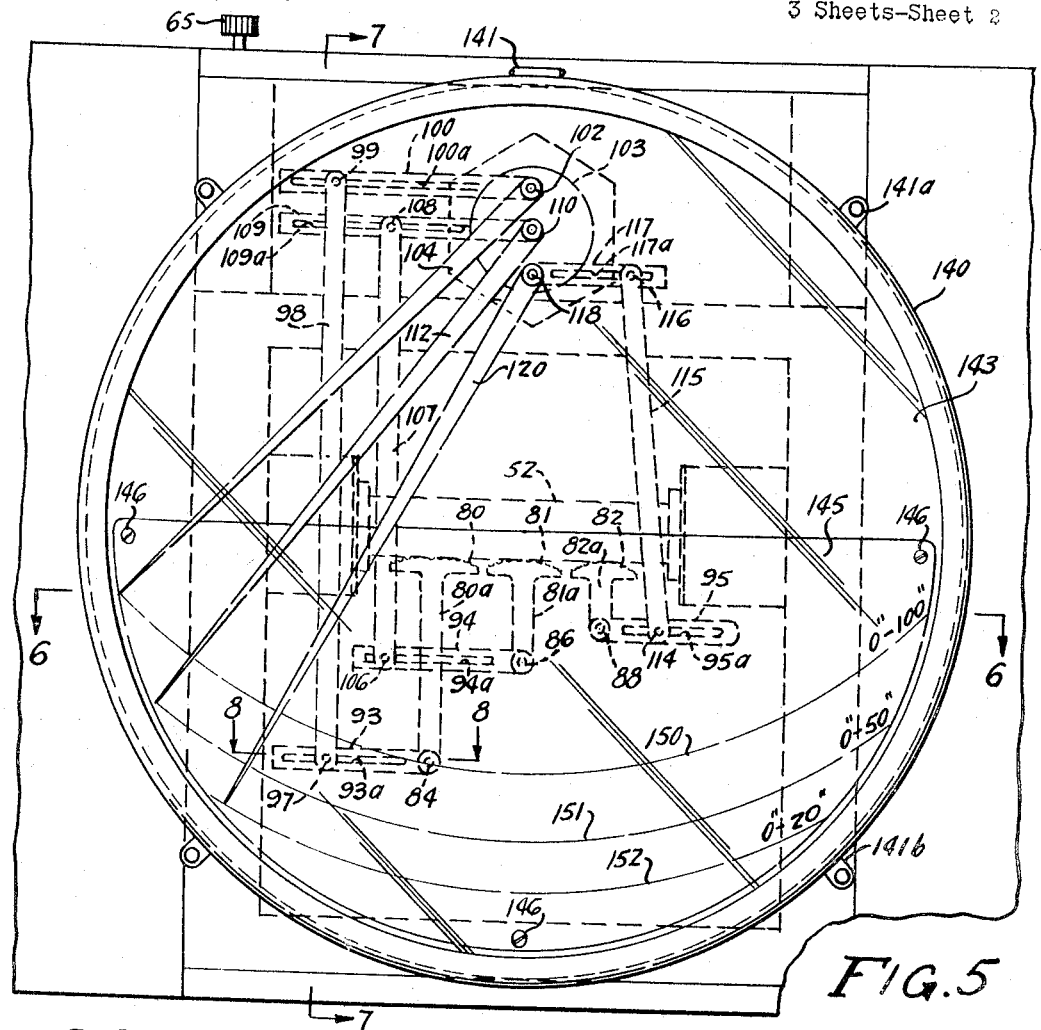
FIGURE 5 is an enlarged front elevational view of the indicating or recording means of the differential unit, taken on lines 5—5 of FIGURE 2 substantially in the direction of the arrows.

Referring more specifically to the drawings wherein like reference numerals represent like parts, FIGURE 1 shows an exemplary embodiment of the invention in connection with a test set-up therefor, comprising, in general, flanged tubular conduits 20, 21, an orifice plate 22 sandwiched therebetween and held in place by bolts 23, a high pressure test conduit 24 having a valve 25 therein and a low pressure side test conduit 26 including a valve 25 and a low-side test conduit means 26 including valve means 27. Conduits 24 and 26 are connected to manifold means 28 and 28a, respectively, of differential pressure unit means 29 which includes an indicating or recording means 30. Test conduits 24 and 26 are interconnected by a by-pass conduit 31 having a pair of valves 32 and 33 having an intermediate blow-down valve means 34, as shown.

Figure 7:
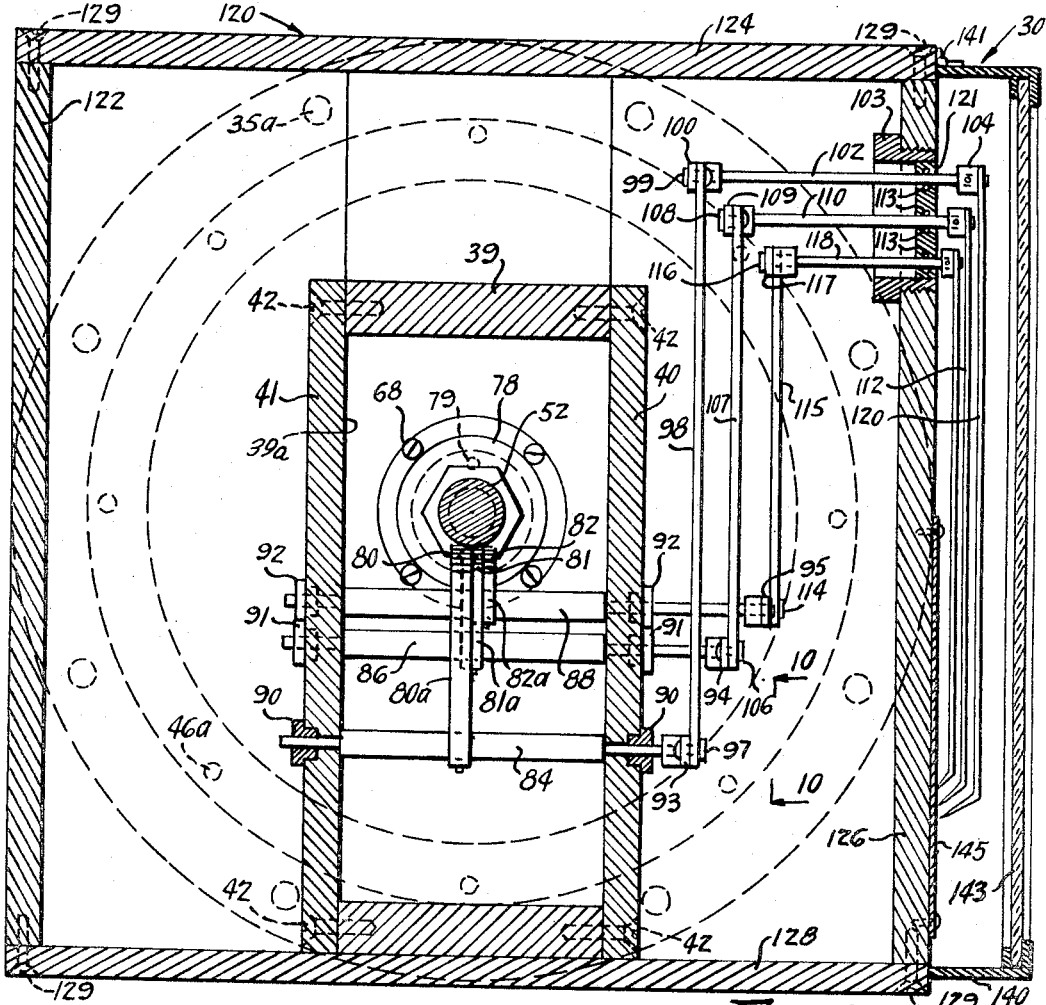
FIGURE 7 is a cross-section view of FIGURE 5 taken on lines 7—7 in the direction of the arrows.

The differential pressure unit 29 is comprised of an end manifold means 28 and 28a secured by screws 35, or other similar fasteners, to diaphragm housing means 36 and 37 in turn secured by screw 38 to gear housing means 39 which has a front and back cover 40, 41, respectively secured to gear housing means 39 by screws 42 as best shown in FIGURES 2, 3, and 7.

Diaphragm housing 36 and manifold 28 form a compartment in which is positioned a collapsible and expansible diaphragm means 43. An O-ring 44 lies along the interface of housing 36 and manifold 28 to seal the compartment and thereby make it pressure tight. Diaphragm 43 is sealably secured in a recess formed in housing 36 by a ring 45, secured to housing 36 by a plurality of screws 46. An O-ring 47 resides between ring 45 and housing 36 to facilitate the sealing of chamber 51. Manifold 28 includes a threaded high pressure inlet aperture 48 connected to conduit 24 thereby providing communication between the high pressure side of orifice 22 and the outside surface 49 of diaphragm 43.

The inside surface 50 of diaphragm 43 and housing 36 define an inner chamber 51 filled with a desired captive fluid which communicates by an aperture 56 with the interior sealed chamber 39a of gear housing 39.

A valve rod 52 communicates with chamber 51 through an aperture 53 formed in gear housing 39. A valve seating surface 54 is formed by housing 36 with an O-ring 55 being placed therein for preventing communication through fluid escape aperture 56 when valve rod 52 is reciprocated a predetermined distance to the right as shown in FIGURE 3. Valve rod 52 is secured to range spring 57 by a plate 58 and a pair of nuts 59 received on a threaded section of valve rod 52. Range spring 57 is affixed to the inner surface of gear housing 39 by a washer 69 and screws 68.

Valve rod means 52 on the high pressure side has a seating surface means 60 which coacts with seating surface means 54 and is secured to centrally apertured back-up plate means 62 and diaphragm means 43 by screw nut means 63, as shown particularly in FIGURE 3.

Fluid aperture 56 is selectively restricted by a pulsation dampener screw needle valve 65 positioned to engage a valve seat 56a in aperture 56 as best shown in FIGURE 3. Gear housing 39 forms a central aperture 66 slidably receiving valve rod 52 with an O-ring 67 sealably surrounding the high pressure of valve rod 52.

Referring to the low pressure side of differential pressure unit 29, manifold means 28a is sealably secured by a plurality of screws 35 and O-ring 44 to diaphragm housing 37. Housing 37 is secured to gear housing 39 by screws 38 or other desired means. Diaphragm 70 is sealably secured between housing 37 and manifold 28a by a ring 48a, a plurality of threaded screws 46 and O-rings 44 and 47, as shown.

The low pressure end of valve rod means 52 terminates in an integral pressure seating means 72 and screw thread and nut means 73 which carries thereon back-up plate means 74 for diaphragm 70 to prevent pressure rupture thereof. Housing 37 has therein a corresponding central seating surface 75 and an O-ring 76. Housing means 37 and diaphragm 70 define a low side inner chamber 51a having a desired captive fluid therein which communicates by an aperture 79 with the interior sealed chamber 39a of gear box means 39.

Range spring 78 is secured to valve rod 52 by a plate 79b sandwiched between a pair of nuts 79a threadably received on valve rod 52. Range spring 78 is secured to the inner wall of gear housing 39 by a washer 69 and a plurality of screws 68. Gear housing 39 communicates by an aperture 79 with valve seating surface 75 below O-ring 76 as shown in FIGURE 3.

Figure 8:
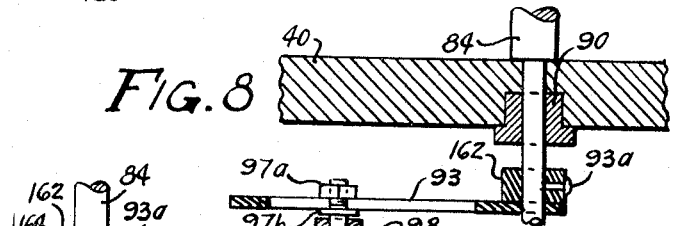
FIGURE 8 is an enlarged fragmental sectional view taken substantially on lines 8—8 of FIG. 5 in the direction of the arrows.

Valve rod 52 has an extended intermediate helical worm tooth portion 52a forming a series of spaced corrugations and constituting a rack comating with a plurality of arcuate gear segments 80, 81, 82, carried on shafts 84, 86, 88 respectively. Shafts 84, 86, 88 are mounted in suitable bearings 90, 91, 92 respectively, in front and back covers 40, 41 as best shown in FIGURES 4, 7 and 8.

Figure 6:
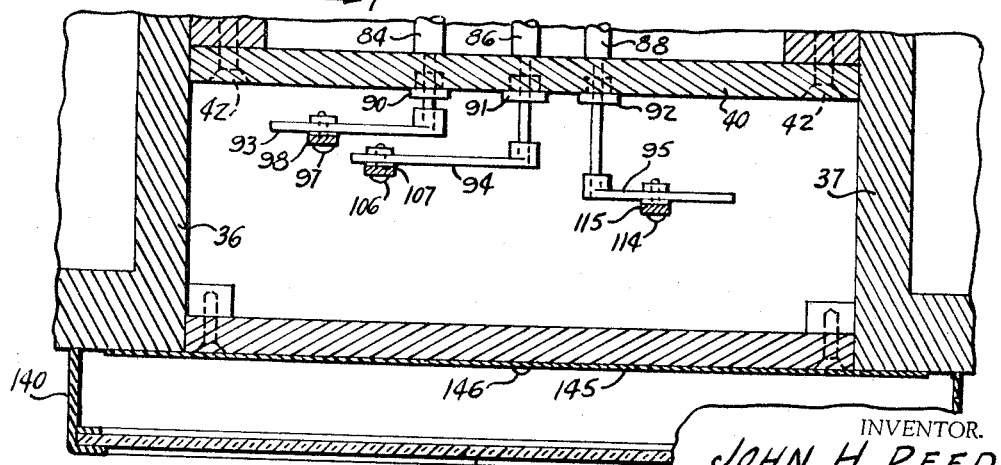
FIGURE 6 is a fragmentary sectional view of FIGURE 5 taken on lines 6—6 in the direction of the arrows.

Referring particularly to FIGURES 5, 6, and 7, shaft means 84, 86, and 88 terminate at their distal ends in a shoulder adapted to be secured to levers 93, 94, 95 having therein slots 93a, 94a, and 95a, respectively, as a calibrating or adjusting means.

Lever 93 is connected to shaft 84 and is adjustably secured to linkage 98 by a screw and bolt 97 cooperating with slot 93. Linkage 98 is connected at the upper end thereof by a screw and bolt 99 in a slot 100a formed by lever 100. Lever 100 is radially and fixedly carried on the end of a shaft 102 by set screws or other suitable means. Shaft 102 is rotatably mounted in a bearing 121 in a torque tube 103 and operatively connected to indicator or pointer hand 104 of indicating unit 30. Note particularly FIGURES 5 and 7.

Lever 94 is connected to shaft 86 and is adjustably secured to linkage 107 by a nut and bolt 106 cooperating with slot 94a. The upper end of linkage 107 is connected by a nut and bolt 108 in a slot 109a in lever 109 which is radially and fixedly carried on the end of shaft 110 by a set screw or the like. Shaft 110 is mounted in bearing 122 in torque tube 103 and is further operatively connected to indicator pointer 112 of unit 30.

Lever 95 is connected to shaft 88 and is adjustably secured to linkage 115 by a nut and bolt 114 cooperating with slot 95a as best seen in FIGURE 5. The upper end of linkage 115 is secured to lever 117 by a nut and bolt 116 cooperating with slot 117a. Lever 117 is radially and fixedly carried on the end of shaft 118 which is mounted in bearing means 121 and further operably connected to indicator hand 120.

Shaft means 102, 110, and 118 are suitably sealed by O-ring means 113 in bearing means 121 of torque tube means 103 of FIGURE 7.

Referring to FIGURES 3 and 7, housing means 39 is protectively secured by outer casing means 120 comprised of plate like means 122, 124, 126, and 128 suitably secured together by screws 129 or the like.

Lever means 100, 109, and 117, as best shown in FIGURES 5 and 7, have adjusting or calibrating slot means 100a, 109a, and 117a, respectively therein.

Figures 9, 11:
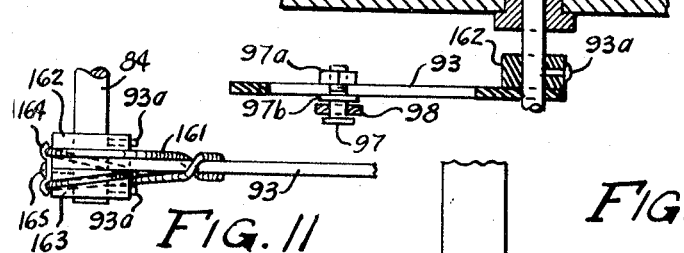
FIGURE 9 is a fragmentary view of a modified construction in which the bearing means in torque tube housing of FIGURE 7 is replaced by three concentric tubular shaft bearing means.
FIGURE 11 is a plan segmental view of FIGURE 10 showing the spring clutch means between the lever and shaft means of FIGURE 10.

In FIGURE 9 bearing 121 and shafts 102, 110, and 118 of FIGURE 7 have been replaced by concentric tubular shaft means 102a, 110a, and 118a, respectively, passing through torque tube means 103a.

The hand or pointer indicator means 104, 112, and 120 of indicator means 30 of FIGURE 1 may be an indicating means as shown in FIGURE 9 or of the pen recording type as shown in FIGURE 7.

Referring to FIGURES 2, 5, 6, 7, and 9, the indicating means 30 comprises a face ring 140 secured to an outer casing 124 by hinge 141, or screws 141a cooperating with lugs 141b, or other suitable means, as desired. Ring 140 contains therein a transparent glass or plastic panel 143. In FIGURE 9, ring 140 may be pressed onto ring extension 141c carried by outer housing 124 and 126 as shown, or in any other suitable manner.

In FIGURES 1, 5, and 7, indicating scale means 145 is secured by a plurality of screws 146 to housing 126. Scale means 145 carries indicating scales 150, 151, and 152 for indicating hand or pen means 104, 112, and 120, respectively, for the various ranges of differential pressures to be measured at orifice 22 of FIGURE 1 during various types of fluid flow.

Referring to FIGURE 8, shaft 84, similar to shaft 86 and 88, is carried by suitable bearing in cover 40. Lever 93 is rotatably mounted on shaft 84 between collars 162 and 163 secured to shaft 84 by screws 93a. Lever 98 is attached to lever 93 by bolt 97, nut 97a and washer 97b, as shown, to allow for variation in positioning while maintaining a pivotal attachment.

Figure 10:
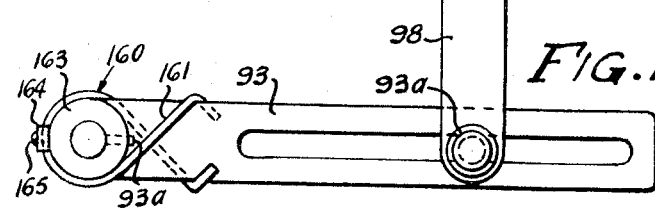
FIGURE 10 is an enlarged segmental view of the linkage and shaft means of FIGURE 7 taken substantially on lines 10—10 in the direction of the arrows.

Referring to FIGURES 8, 10, and 11, lever means 93 is yieldingly secured to shaft 84 by a spring clutch 160 comprised of spring 161, and a pair of collars 162 and 163 secured by screws 93a to shaft 84. Spring 161 is secured to collars 162 and 163 by clip 164 fixed by screw 165. Spring 161 grips both upper and lower edges of lever 93 which serves as a flexible link or clutch means 160 between link 93 and collars 162 and 163 fixedly secured by screw 93a to shaft 84 to prevent injurious overdrive of pointer 104.

Shafts 86 and 88 are likewise secured to lever or linkage 107 and 115 by spring clutches 160 to prevent injurious over drive of pointer or indicating hand means 112 and 120.

Gears 80, 81, and 82 are dimensioned to provide the various readings on the scale.

Differential pressure cell 29 may be calibrated in various types of measurement, as desired, for example, inches of water, inches of mercury, pounds and ounces, or other desired units.

As exemplary of preferred dimensions for the device of the instant invention, range springs 57 and 78 are of a strength to hold valve rod 52 and high side diaphragm 43 from being collapsed completely until valve rod 52 has traveled, for example, .250 of an inch. At .300 of an inch of travel (considered an over range), the check valve on the high side comprised of seating surfaces 54 and 60 will close and lock remaining fluid in the inner high side chamber defined by diaphragm 43 and housing 36. As valve rod 52 moves gear 80 is of a radius to move the pointer 104 from 0 inches to 100 inches of water pressure. Gear 81 is half as large in radius as gear 80, so while gear 80 and pointer 104 are going off of scale 150, gear 81 has moved twice as fast to record on scale 151. Gear 82 has a radius 82a which is one-fifth as large as radius 80a of gear 80, so gear 82 has gone 5 times as fast as gear 80, and approximately twice as fast as gear 81 through radius 81a. For example, in FIGURE 9, of a given differential pressure reading of 18 inches of water pressure, the 100″ pointer 104 would point to 18″ of water and scale 150, and the 50″ pointer 112 would point to 18″ of water on scale 151, and the 20″ pointer 120 would point to 18″ of water on scale 152.

When the differential pressure is very small, the 100″ pointer 104 will register just above zero, and the 20″ pointer 120 will magnify the reading of pointer 104 five times. Therefore, the pointer giving the best reading may be used and the reading of the other two pointers may be disregarded. A circular or other type of chart 145 may be used.

In further describing operation of the three illustrated scales, in the drawings, if the differential pressure should exceed 50" (say 64" water pressure) the 0–20 inch pointer 120 and the 0–50 inch pointer 112 would have exceeded their range and be stopped by a stop on the dial without damage because of flexibility of spring clutch means 160. Gears 81 and 82 will still have to turn as the 100" pointer 102 goes on to its maximum range. The linkage on gears 82 and 81 compensates for this further turning torque which is taken up by a spring clutch 160, as illustrated in FIGURES 10 and 11.

In summary, there may be a plurality of scales each connected to different radii of one of the gears, or there may be a single scale with a plurality of pointers, as illustrated in FIGURE 5, as desired.

In other words, there may be either a plurality of scales or a plurality of pointers, as desired, depending on the operator's preference or type of measurement desired of the D.P. cell. For example, the instant invention will give one precise indication from 0–100 inches of water pressure, 0–50 inches of water pressure, and 0–20 inches of water pressure. Each scale may be also calibrated in both inches of water pressure or in inches of mercury pressure, as desired. Range spring means 57 and 78, and radii 80a 81a, and 82a of gears 80, 81, and 82 determine the type of calibration on levers 100, 109, and 117 by adjusting bolt means 99, 108, and 116 and the pen arms and pointers 104, 112, and 120 of the indicating or recording apparatus of the differential pressure cell.

An explanation of the operating principle of the invention will be explained on differential pressure cell 29 used as an orifice meter measuring fluid through a pipe line means 20 and 21 and orifice plate 22 of FIGURE 1.

The high side manifold 28 is connected to test pipe means 24 on the upstream or high side of the orifice plate 22 with valve means 32 closed. Likewise, the low side manifold 28a is connected by test pipe 26 to the low side of orifice means 22 with valve means 33 closed.

Now to obtain a reading open valves 25 and 27 slowly on both sides of the orifice flange. After a steady flow of fluid through orifice 22 is attained, the differential pressure cell or unit 29 will then register a reading of the difference of pressure through the orifice plate.

As the fluid goes through the pipe line that is restricted by the orifice plate 22, pressure builds up on the upstream side of the plate and causes more pressure on the diaphragm 49. Diaphragm 49 is very flexible and will move the valve rod 52 to the right. The inside of both high and low diaphragms 49 and 70 and gearbox 39 are filled with a desired captive fluid and will keep the diaphragms from collapsing. As diaphragm 43 moves to the right, fluid of chamber 51 is displaced to the low side chamber means 51a through passage 79. As this fluid movement takes place, the range springs means 57 and 78 are calibrated by nut means 59 and 79, respectively, to inches of water to stop the movement of valve rod 52 at the difference of pressure. This difference of pressure is then read on a dial 145 or recorded on a chart of indicating unit 30. Gears 80, 81, and 82 move when valve rod 52 moves. These ranges of reading of differential pressure of fluid flow will be especially helpful on irregular gas flow as the 0–100 inch scale will not measure the low flow through a given size of orifice plate 22. When the 0–100 inch scale is not indicating, the 0–50 inch will be under certain conditions of fluid flow. When the 0–50 inch scale is not indicating, the 0–20 inch scale will be indicating. The same holds true when there is too much fluid flowing. The 0–20 inch scale will go off scale first. If more fluid is flowing than the 20 inch scale can handle, the 50 inch scale will record. If there is still too much gas for the 50 inch scale to record, the 100 inch scale will be recording, etc.

The radii of gears 80, 81, and 82 can be sized to give one of the following scales, 200, 150, 100, 50, 20, and 10 inches of water, or in inches of mercury or pounds per square inch, or other units of measurement, as desired.

Gears may also be added to the bottom of valve rod 52, and have mercury shut down switches on regulator controls (not shown) to control the fluid flow at a given rate and pressure.

One of the many novel features of this invention resides in the dampening effect of the pulsation dampener needle valve means 65 to prevent hunting effects between the linkages and valve rod means 52.

Another novel feature of the invention resides in the integrator reaction between the inner pressure chambers 51 and 51a of the high side manifold and low pressure side manifold, gear means 80, 81, and 82 and valve rod means 52 to give a smooth and reliable result of indicating differential pressure readings of orifice fluid flow on indicating unit 30.

From the foregoing it will now be seen that there is herein provided an improved differential pressure measuring system for fluid flow which accomplishes all the objects of this invention, and others, including many advantages of great practical utility and commercial importance.

It is to be understood, of course, that the foregoing disclosure relates to a preferred embodiment of the invention as illustrated, that various modifications and changes may be made in the invention by those skilled in the art without departing from the spirit and scope of the invention as set forth in the appended claims.

I claim:

1. A differential pressure measuring unit for fluid flow through an orifice or the like in a conduit comprising a high side pressure manifold means adapted to be connected to the upstream side of an orifice means, a low side pressure manifold means adapted to be connected to the downstream side of the orifice means, gear box means operatively connecting said high side pressure manifold means and said low side pressure manifold means, each of said manifold means comprising an intermediate spaced sealed diaphragm means therein dividing said manifold means into an outer fluid chamber adapted to communicate with orifice connection of a fluid flow conduit means and an inner fluid chamber means containing captive fluid therein, spring biased valve rod means communicating with said inner chamber means of each manifold means, said valve rod means comprising an intermediate gear tooth portion, calibration range spring means secured by screw means to each inner side wall of said gear box means and to each end portion of said valve rod means, gear means carried by shaft means transverse to the longitudinal axis of said valve rod means, said gear means operatively comating with said intermediate gear tooth portion in response to the differential resultant orifice pressure between the high side and low side pressure diaphragms of said manifold means, plural adjustable linkage means operatively connected to the shaft means carrying said gear means, and power take-off shaft means adapted to be operatively connected to an indicating and recording differential pressure unit wherein said valve rod means comprises valve seating means operatively comating with like valve seating means in the outer side wall portions of said gear box means to limit the travel of said valve rod means during differential pressure measurement of fluid flow through an orifice.

2. A differential pressure measuring unit for measuring fluid flow through an orifice or the like in a conduit as in claim 1, wherein said aperture between said inner diaphragm chamber of said high side pressure manifold means and the sealed inner chamber of said gear box means comprises a pulsating dampening needle valve means in said aperture means to provide smooth operation and preventing hunting and pulsating vibration of said gear and linkage means of said differential pressure measuring unit during measurement of fluid flow through a conduit.

3. A differential pressure measuring unit for measuring fluid flow through an orifice and the like in a conduit as in claim 2, wherein said gear means and said linkage means are operatively interconnected by a spring clutch means to prevent injurious overdrive strain on the indicating pointers of said indicating unit.

4. A differential pressure measuring unit for measuring fluid flow through an orifice and the like in a conduit as in claim 3, wherein said linkage means includes slot adjusting means therein.

5. A pressure differential measuring device comprising:
a frame having a pair of pressure chambers;
a reciprocably mounted rod, extending into each of the chambers;
expansible and collapsible diaphragm means, in each chamber, fixed adjacent each end of the rod for reciprocating the rod in proportion to the magnitude of the pressure differential between the chambers;
a plurality of rotatable pointers of varying scale for indicating the pressure differential sensed by the diaphragm means; and
an individual motion transmitting linkage for each pointer separately and unrelatedly connecting the rod to each pointer for translating the reciprocable movement of the rod into varying degrees of rotary movement of each pointer, the motion transmitting linkage of each pointer being independent from every other motion transmitting linkage.

6. The pressure differential measuring device of claim 5 wherein
the rod forms a series of spaced corrugations; and
the motion transmitting linkage includes
a plurality of arcuate toothed gears, one for each pointer, in meshing engagement with the corrugations; and
a plurality of linkages separately connecting each of the gears to a separate pointer for rotating the pointer in proportion to the rotation of the gear.

7. The pressure differential measuring device of claim 6 wherein the toothed gears are of increasing radii of curvature and further including means rotatably mounting each gear on the device at its radius of curvature.

8. A differential pressure measuring system for fluid flow comprising
a differential pressure unit having a high pressure manifold and a low pressure manifold;
an expansible and collapsible diaphragm means in each manifold;
a movably mounted rod, interconnecting the diaphragm for movement in response to the pressure differential between the chambers forming a series of gears;
means for indicating the pressure differential sensed by the diaphragm means including
at least three scales of differential pressure on the device;
a pointer, associated with each of the scales for indicating the pressure differential;
means interconnecting the rod and the pointers including
a radial gear segment in meshing engagement with the gears on the rod; and
a plurality of linkage means for moving the pointers in response to movement of the gears; and
spring clutch means connecting the gear segment and each of the linkage means for preventing overdrive of the linkage means.

9. A differential pressure measuring system for fluid flow as in claim 8, wherein said linkage means includes slot adjusting means therein.

10. A differential pressure measuring system for fluid flow as in claim 9, wherein said valve rod means includes spring and nut calibrating means thereon.

References Cited by the Examiner

UNITED STATES PATENTS

| | | | |
|---|---|---|---|
| 1,058,092 | 4/1913 | Pew et al. | 73—407 |
| 1,381,139 | 6/1921 | Smoot | 73—407 X |
| 2,078,277 | 4/1937 | Risk | 73—407 |
| 2,374,523 | 4/1945 | Beecher | 73—205 |
| 2,561,700 | 7/1951 | Hughes | 73—407 X |
| 2,627,750 | 2/1953 | Titus | 73—407 |
| 2,632,474 | 3/1953 | Jones. | |
| 2,674,121 | 4/1954 | Gorman | 73—407 X |
| 2,689,480 | 9/1954 | Angst | 73—407 |
| 3,126,863 | 3/1964 | Du Feu | 73—179 X |

FOREIGN PATENTS 1,007,837 2/1952 France.

RICHARD C. QUEISSER, *Primary Examiner.*

E. D. GILHOOLY, *Assistant Examiner.*